United States Patent
Kil et al.

(10) Patent No.: US 8,804,165 B2
(45) Date of Patent: Aug. 12, 2014

(54) IMAGE FORMING APPARATUS AND METHOD OF MANAGING JOBS THEREOF

(75) Inventors: Hyun-sub Kil, Daejeon (KR); Sun-young Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 862 days.

(21) Appl. No.: 12/188,287

(22) Filed: Aug. 8, 2008

(65) Prior Publication Data
US 2009/0083582 A1    Mar. 26, 2009

(30) Foreign Application Priority Data

Sep. 21, 2007    (KR) .................. 10-2007-0096928

(51) Int. Cl.
*G06F 3/12* (2006.01)
*G06K 15/00* (2006.01)
*G03G 15/00* (2006.01)

(52) U.S. Cl.
USPC ....... 358/1.15; 358/1.13; 358/1.14; 358/1.16; 358/1.18; 399/10; 399/11; 399/12; 399/17; 399/18; 399/19; 399/20

(58) Field of Classification Search
None
See application file for complete search history.

(56) References Cited

U.S. PATENT DOCUMENTS

| 7,389,448 | B2 | 6/2008 | Sakai | |
|---|---|---|---|---|
| 7,969,593 | B2 | 6/2011 | Toda | |
| 2002/0097429 | A1* | 7/2002 | Ferlitsch | 358/1.15 |
| 2006/0050292 | A1 | 3/2006 | Morikawa et al. | |
| 2006/0158518 | A1* | 7/2006 | Sakai | 348/207.2 |
| 2007/0014614 | A1* | 1/2007 | Yoshida | 400/62 |
| 2007/0046995 | A1* | 3/2007 | Toda | 358/1.16 |
| 2007/0109586 | A1* | 5/2007 | Yamada et al. | 358/1.14 |
| 2007/0253013 | A1* | 11/2007 | Shudo | 358/1.14 |
| 2007/0285717 | A1* | 12/2007 | Muto et al. | 358/1.16 |

FOREIGN PATENT DOCUMENTS

| JP | 2000-075981 | 3/2000 |
|---|---|---|
| JP | 2003-241948 | 8/2003 |
| JP | 2007-65898 | 3/2007 |
| KR | 10-2006-0004940 | 1/2006 |

OTHER PUBLICATIONS

Korean Office Action issued Jul. 19, 2013 in corresponding Korean Patent Application No. 10-2007-0096928.

* cited by examiner

*Primary Examiner* — Benny Q Tieu
*Assistant Examiner* — Haris Sabah
(74) *Attorney, Agent, or Firm* — Staas & Halsey LLP (57) ABSTRACT

An image forming apparatus and a job management method thereof are provided. The job management method includes detecting an occurrence of an error during a processing of a job, and upon detecting the occurrence of the error, providing information about one or more jobs related with the error from among a list of jobs. As a result, it is possible to manage the jobs related with an error and more convenient job management is provided.

23 Claims, 4 Drawing Sheets

| FAX JOB LIST | | | |
|---|---|---|---|
| No. | Name | Type | Status |
| 1 | Sending Fax | FAX | Line error |
| 2 | Delay Fax | FAX | Pending |
| 3 | Sending Fax | FAX | Pending |
| 4 | Sending Fax | FAX | Pending |
| 5 | Sending Fax | FAX | Pending |

| ERROR LIST | | | |
|---|---|---|---|
| No. | Name | Type | Status |
| 11 | Sending Fax | FAX | Line error |
| 12 | Delay Fax | FAX | Pending |
| 13 | Sending Fax | FAX | Pending |
| 14 | Sending Fax | FAX | Pending |
| 15 | Sending Fax | FAX | Pending |

FIG. 6

IMAGE FORMING APPARATUS AND METHOD OF MANAGING JOBS THEREOF

CROSS-REFERENCE TO RELATED APPLICATION

This application claims all benefits accruing under 35 U.S.C. §119 from Korean Application No. 2007-96928, filed in the Korean Intellectual Property Office on Sep. 21, 2007, the disclosure of which is incorporated herein by reference.

BACKGROUND OF THE INVENTION

1. Field of the Invention

Example embodiments of the present invention relate generally to an image forming apparatus and a method of managing jobs thereof, and more particularly, to an image forming apparatus capable of providing error related information when an error occurs, and a method thereof.

2. Description of the Related Art

An image forming apparatus forms an image onto a recording medium based on printable data generated by a terminal device, such as a computer. Examples of the image forming apparatus include copiers, printers, facsimiles, or multi-function peripherals (MFP) that integrate functions of the above devices into a single body.

Image forming apparatuses nowadays are connectible through networks for use by a plurality of users. These image forming apparatuses employ a high capacity storage device to store and process a plurality of jobs received from the plurality of users.

An image forming apparatus may fail to complete a given job and end an operation in the middle of the operation due to errors in the image forming apparatus or user's erroneous setting of the job or the image forming apparatus. The problem occurs when jobs, such as fax transmission or email transmission that require communication with the external devices, encounter an error. For example, if an error occurs during fax transmission, such as when a fax number is incorrect, the operation does not continue, but rather, the particular step that is affected by the error is re-tried for a predetermined number of times. If the given job is not completed, the job is halted, and if the error is not dealt with appropriately, the job is canceled. The problem is more severe if a plurality of fax jobs is queued behind the job containing the error.

SUMMARY OF THE INVENTION

Several aspects and example embodiments of the present invention provide an image forming apparatus capable of managing jobs that are expected to have an error by providing error-related information about the job, and thereby managing the jobs more conveniently, and a method thereof.

Additional aspects and/or advantages of the invention will be set forth in part in the description which follows and, in part, will be obvious from the description, or may be learned by practice of the invention.

According to an example embodiment of the present invention, a method of job management of an image forming apparatus is provided. The method includes detecting an occurrence of an error during a processing of a job, and upon detecting the occurrence of the error, detecting and providing information about one or more jobs related to the error from among a plurality of jobs in a list of pending jobs.

According to another example embodiment of the present invention, the detecting and providing of the information includes categorizing the information regarding the job having the error and the jobs related to the error according to job attributes and displaying a result thereof.

According to another example embodiment of the present invention, the job attributes include at least one of a user, a type, a date, a number of pages, and a priority thereof.

According to another example embodiment of the present invention, the detecting and providing of the information includes transmitting the information regarding the job having the error and the jobs related to the error to a terminal device connected to the image forming apparatus.

According to another example embodiment of the present invention, storing or deleting the job having the error and the jobs related to the error is further provided.

According to another example embodiment of the present invention, performing a next job is further provided, if the job having the error and the jobs related to the error are stored or deleted according to a previously set condition.

According to another example embodiment of the present invention, setting one or more job management attributes to manage the job having the error and the jobs related to the error, and performing job management on the job having the error and the other job having the same error according to the job management attributes, are further provided.

According to another example embodiment of the present invention, the job management attributes selected and/or are input by a user.

According to another example embodiment of the present invention, the performing of the job management includes categorizing the job having the error and the jobs related to the error according to the job attributes and providing the result thereof, if the job management attributes include a categorization operation, storing a job designated by a user selection, if the job management attributes include a storing operation, or deleting a job designated by the user selection, if the job management attributes include a deletion operation.

According to another example embodiment of the present invention, an image forming apparatus is provided. The image forming apparatus includes an error detecting unit to detect an occurrence of an error during processing of a job, and a control unit to control detection and provision of information regarding the job having the error and jobs related to the error from among a plurality of jobs from a list of pending jobs, upon determining of the occurrence of the error by the error detecting unit.

According to another example embodiment of the present invention, a storage unit to store information about the jobs, and a display unit to display the information are further provided. Among the jobs stored in the storage unit, the control unit categorizes the information regarding the job having the error and the jobs related to the error according to job attributes and provides the result as the information.

According to another example embodiment of the present invention, the job attributes include at least one of a user, a type, a date, a number of pages, and a priority thereof.

According to another example embodiment of the present invention, an interface unit connected to a terminal device is further provided. The control unit provides the information regarding the jobs related to the error to the terminal device through the interface unit, if the error detecting unit detects the error of the job.

According to another example embodiment of the present invention, the control unit performs a control operation so that the job having the error and the jobs related to the error are stored to the storage unit or deleted according to a previously set condition.

According to another example embodiment of the present invention, the control unit performs a control operation to cause a next job in the list to be processed if the job having the error and the jobs related to the error are deleted.

According to another example embodiment of the present invention, a user manipulation unit is further provided to allow selection or input of job management attributes regarding the job having the error and the jobs related to the error.

According to another example embodiment of the present invention, if the job management attributes include a categorization operation, the control unit categorizes the job having the error and the jobs related to the error according to job attributes and provides the result thereof.

According to another example embodiment of the present invention, the job attributes include at least one of a user, a type of the job, a date, a number of pages, and a priority thereof.

According to another example embodiment of the present invention, a storage unit is further provided. The control unit stores a job designated by a user selection to the storage unit if the job management attributes include a storing operation, and deletes a job designated by the user selection if the job management attributes include a deletion operation.

According to another example embodiment of the present invention, a method of managing jobs of an image forming apparatus connected to a network for use by multiple users includes determining a cause of an error in a job upon occurrence of the error during a processing of a plurality of jobs; detecting one or more of the plurality of jobs having the same error from among the plurality of the jobs prior to an occurrence of the error in the one or more of the plurality of jobs; and managing the one or more of the plurality of jobs having the same error based on received job management attributes.

According to another example embodiment of the present invention, an image forming apparatus includes an image forming unit to form an image on a printable medium in response to a job request by a user; and a control unit to: determine a cause of an error in a job upon occurrence of the error during a processing of a plurality of jobs; detect one or more of the plurality of jobs having the same error from among the plurality of the jobs prior to an occurrence of the error in the one or more of the plurality of jobs; and manage the one or more of the plurality of jobs having the same error based on received job management attributes In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Reference will now be made in detail to the embodiments, examples of which are illustrated in the accompanying drawings, wherein like reference numerals refer to the like elements throughout. The example embodiments are described below in order to explain the present invention by referring to the figures.

In example embodiments, an error may refer to a factor that causes non-performance of a job. In example embodiments, a job related to an error may refer to a job that potentially or actually have the error.

Figure 1:
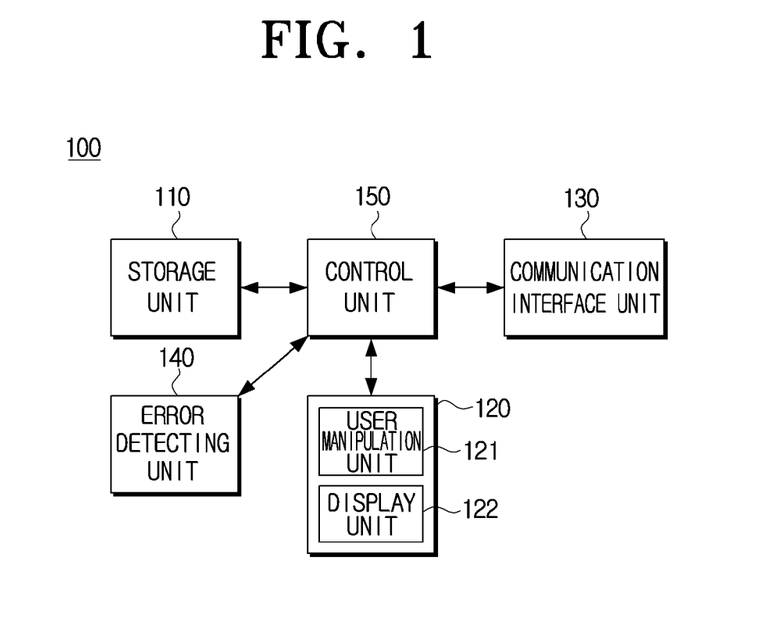
FIG. 1 is a block diagram of an image forming apparatus according to an example embodiment of the present invention.

FIG. 1 is a block diagram of an image forming apparatus according to an example embodiment of the present invention. Referring to FIG. 1, the image forming apparatus 100 includes a storage unit 110, a user interface unit 120, a communication interface unit 130, an error detecting unit 140, and a control unit 150.

The storage unit 110 stores jobs and information about the jobs. More specifically, the storage unit 110 may store information such as a list of current jobs, a list of completed jobs, and attributes of the current jobs. For example, the job attributes may include a name of a user requesting a job, the type of the job, such as printing or faxing, the date and time of the job request, the number of pages required by the job, or the order of the job request. In example embodiments, the job attributes also includes an address of the recipient, or a time when the job should be performed. In example embodiments, the type of the job may also include transmitting, scanning, or other operations to be performed relative to information or data.

The user interface unit 120 provides a user interface to receive a user command or to display a current status and one or more lists of the jobs of the image forming apparatus. The user interface unit 120 may include a user manipulating unit 121 and a display unit 122. The user manipulating unit 121 is a user interface that outputs selecting and requesting signals of a function that is supported by the image forming apparatus 100. The user manipulating unit 121 may be implemented as a touch panel, or a plurality of buttons, such as a keyboard or a key pad. Accordingly, the user may manipulate the user manipulating unit 121 to select a job having an error and other documents related to the error, to thereby perform a necessary management operation.

The display unit 122 displays a current status of the image forming apparatus 100, a list of jobs, and results arising from job management attributes set by the user manipulating unit 121. More specifically, upon displaying a user interface window on a screen (not shown) of the image forming apparatus 100, the display unit 122 indicates a job that has an error and a list of other jobs related to the error (or having the same or similar error), on a portion of the displayed user interface window.

The communication interface unit 130 is connected to a terminal device, such as a computer, or may simply be connected to a network. If an error occurs in the job, the communication interface unit 130 transmits information about the job or jobs related to the error according to a control of the control unit 150.

The error detecting unit 140 detects presence of an error in the job, or in the image forming apparatus 100. Specifically, the error detecting unit 140 detects and notifies the control unit 150 of an occurrence of the error upon determining that an operation cannot be continue due to the error or the user's erroneous setting for the job or the image forming apparatus 100.

Upon detecting the error, the control unit 150 checks the jobs related to the error (or having the same or similar error) from among the list of current jobs stored in the storage unit 110, and provides information about the job having the error and the other jobs related to the error the user, for example. The control unit 150 may provide this information using a variety of measures, including by display, by external transmission, by email, or by short messaging service (SMS), for example.

For example, the control unit 150 may display the information through the display unit 122. If the control unit 150 receives a notification of the error from the error detecting unit 140, the control unit 150 searches the other jobs for those that have high possibility of having the same error, and displays a list of the searched jobs through the display unit 122.

For example, in fax transmission, the control unit 150 may determine and/or detect an error of a user's failure to input fax numbers, or an error of a counterpart facsimile machine having an error in the reception of the fax transmission. Based on the error, the control unit 150 also determines or detects other jobs relate to the error (or having the same or similar error) if the user fails to input fax numbers or if the same counterpart facsimile numbers are used for the other jobs. Accordingly, the control unit 150 controls the display unit 122 to display a list of the same or similar error-related jobs thereon.

For another example, in email transmission, the control unit 150 may detect and/or determine an error if a user fails to input an email address or DNS server address to send an email, or if the user writes or inputs an incorrect email address or an incorrect DNS server address, and also determine that other jobs, from among the list of jobs stored in the storage unit 110, relate to the error if the user fails to input the same email address or if the same DNS server address that is determined to have an error is used for the other jobs. Accordingly, the control unit 150 controls the display unit 122 to display the error-related jobs thereon.

The control unit 150 may perform a control operation so that the job having an error and other jobs related to the error are categorized according to attributes of the jobs, and are displayed on the display unit 122. The automatic categorization can be provided according to one or more settings of the image forming apparatus 100, or according to a job management attribute which is input through the user manipulating unit 121 as a user command. For example, if the jobs are categorized by the user according to the setting of the image forming apparatus, the job having an error and the other jobs related to the error are grouped according to categories chosen by the user and are displayed on the display unit 122. Accordingly, once an error occurs, pending jobs are proactively searched to determine and/or detect those that have the same or similar errors so that the pending jobs with the potential errors are detected without having to encounter each error only when the pending jobs are actually being performed.

The control unit 150 controls the storage unit 110 to store the job having the error and the other jobs related to the error according to one or more predetermined conditions. The control unit 150 also selectively performs a controlling operation so that the job having the error and/or the other jobs related to the error may be deleted from the list of current jobs, and the job that follows on the list is performed. Because the job having the error or the other jobs related to the error will delay the processing of other unaffected jobs, the job having the error and/or the other jobs related to the error are deleted from the list of current jobs so that other unaffected jobs can be performed without the delay.

In example embodiments, the data of the deleted jobs may be stored in the storage unit 110 for later processing. In one implementation, the jobs having the errors may be moved to the end of the list so as not to influence the processing of the other unaffected jobs without being deleted. According to one example embodiment of the present invention, the abovementioned storing and/or deleting of the data of the job having the error and/or the other jobs related to the error may be performed if a user does not input any manipulation (or instructions) within a predetermined time of the occurrence of the error. In example embodiments, a user may be notified to fix the error after the job having the error and/or the other jobs related to the error are moved toward an end of the list. If the error is not fixed within a predetermined time period, the job having the error or the other jobs related to the error then may be deleted, or may be simply not performed. The moving, storing, and/or deleting of the job or data may be notified to a user through the communication interface unit 130 and/or displayed through the display unit 122.

Figure 2:
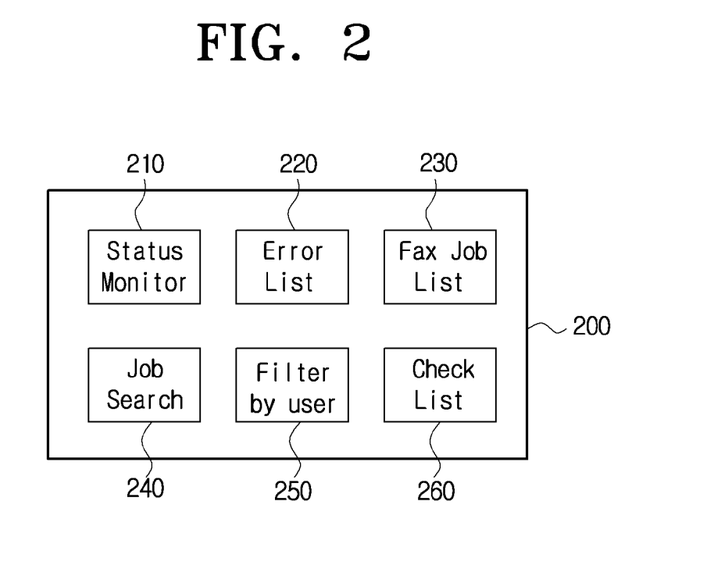
FIGS. 2 to 5 illustrate various examples of a user interface window of an image forming apparatus according to an example embodiment of the present invention.

FIG. 2 illustrates an example of a user interface window of an image forming apparatus according to an example embodiment of the present invention. Referring to FIG. 2, the user interface window may include a region (status monitor) 210 to represent (or indicate) a status of the image forming apparatus, a region (error list) 220 to represent (or indicate) a list of a job having an error and/or other jobs related to the error, a region (fax job list) 230 to represent (or indicate) a list of the jobs currently stored in the image forming apparatus, a region (job search) 240 to represent (or indicate) the user's search factor, a region (filter by user) 250 to represent (or indicate) the result of search based on the user's search factor, and a region (checklist) 260 to select a result of the search for later management of the jobs. Shown regions 210-260 are an example so that other regions may be included in the user interface window.

Figure 3A:
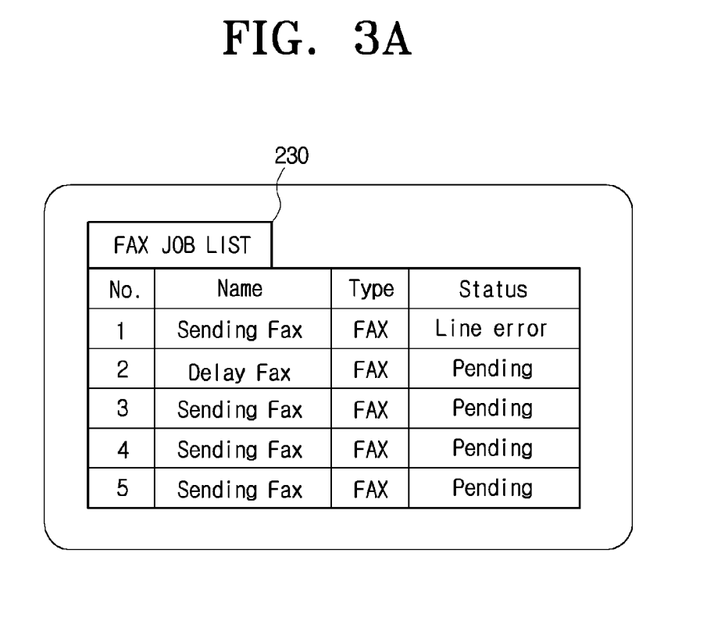

FIG. 3A illustrates an example embodiment of a list of FIG. 2 in detail, including a job having an error. Specifically, the list in FIG. 3A is a fax job list 230 that includes job 1 having a fax transmission error, and other fax jobs 2 to 5 that are currently in a queue.

Figure 3B:
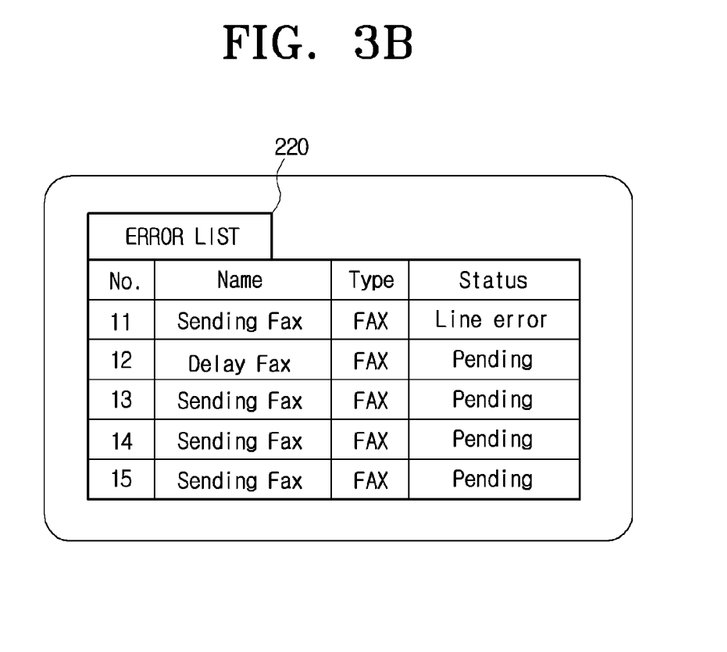

FIG. 3B illustrates an example embodiment of a list of FIG. 2 in detail, including a job having an error and other jobs related to the error. Specifically, the list in FIG. 3B is an error list 220 including a job 11 having a fax transmission error, and other fax jobs 12 to 15 related to the error. That is, in this case, the jobs 12-15 would have the same potential error that caused the error for job 11.

Figure 4:
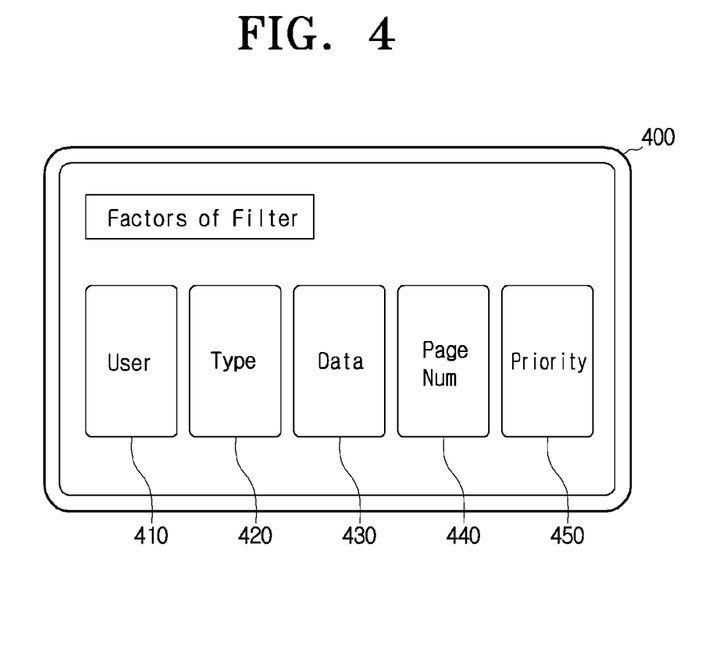

FIG. 4 illustrates in detail filtering factors regarding a user's operation. FIG. 4 indicates the filtering factors used by a user to search, filter and/or categorize the jobs stored in the image forming apparatus 100. As shown, the filtering factors include a user 410, a type 420, a data 430, a page number 440, and priority 450, for example. In example embodiments, an initial search may be conducted using the filtering factors shown. Further, once a result of the search is obtained, the user is able to filter the result of the search again, using the filtering factors illustrated in FIG. 4. Further, because the user can conduct the search or filter the result using a plurality of the filtering factors in combination, the jobs are searched or filtered more easily. In other example embodiments, filtering factors other than those shown may be used, such as destination, size, or others. In example embodiments, techniques for using combined filtering factors include Boolean searching.

Figure 5:
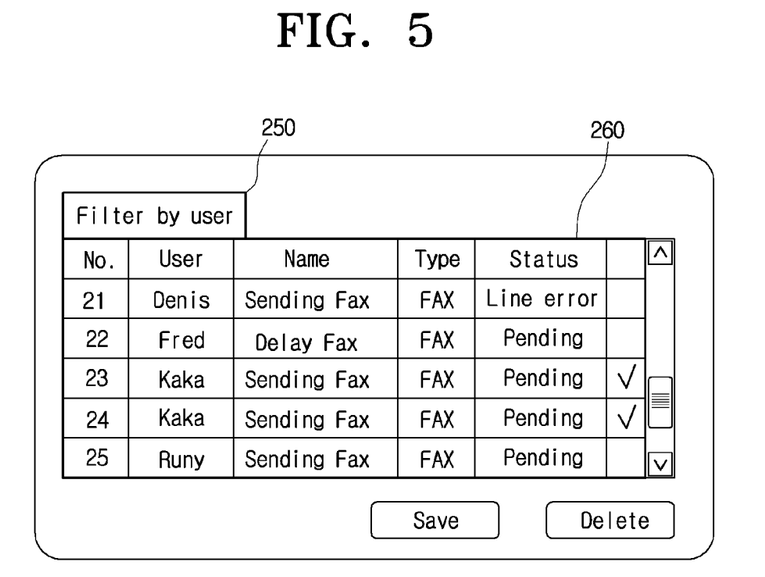

FIG. 5 illustrates in detail the region 250 representing a result of a search conducted with the search factor "user," and the checklist region 260 to select the result of the search for later management of the jobs. FIG. 5 particularly illustrates the result of categorizing the searched jobs of FIG. 3A according to the search factor "user" 410 of FIG. 4. For example, a user may perform a job management regarding a job that is necessary to him or her based on the categorized result. For example, if one or more of the current jobs are ones that are unnecessary to him or her, the user may select to save and/or cancel the jobs according to his or her need.

The user interface window in FIGS. 3A to 5 may be displayed on a single interface window as illustrated in FIG. 2, or alternatively, be displayed sequentially according to the progressing of the user's operation.

Figure 6:
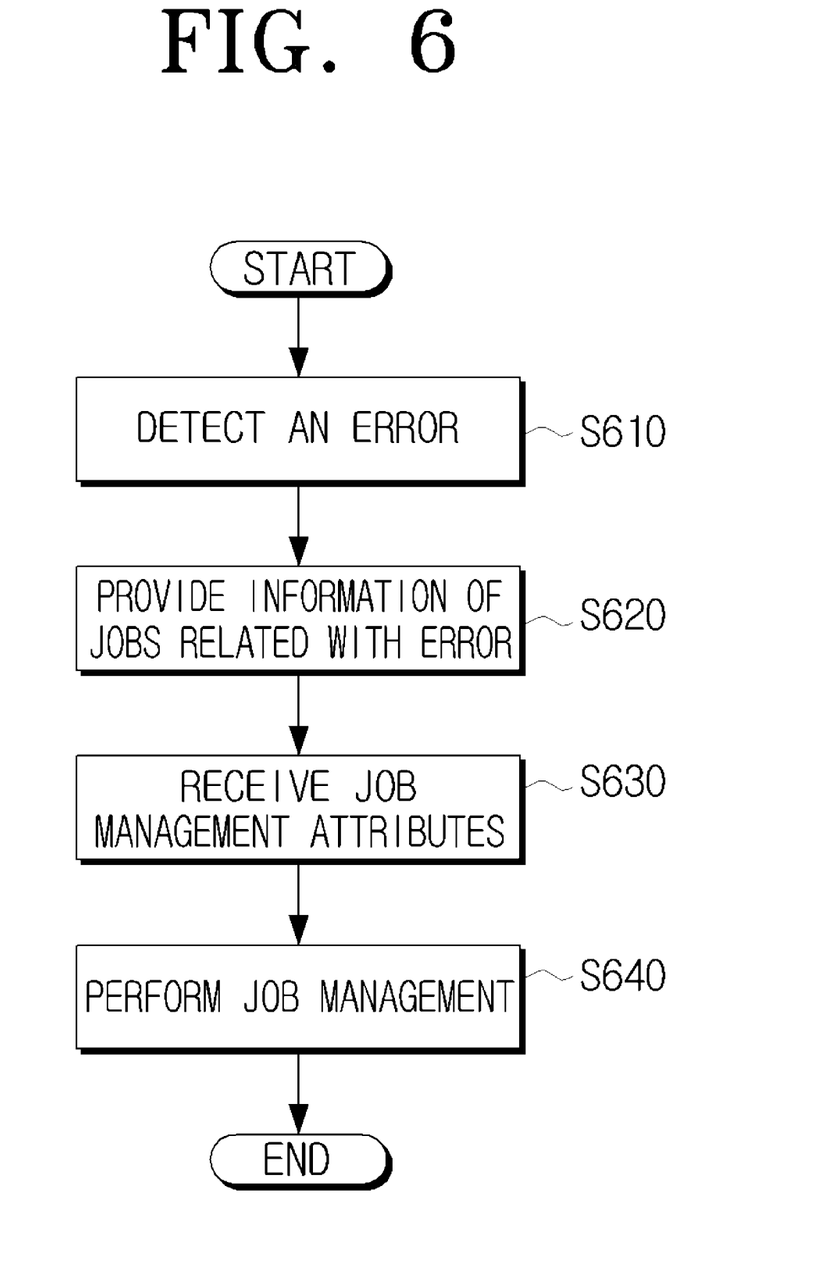
FIG. 6 is a flowchart provided to explain a method of managing jobs of an image forming apparatus according to an example embodiment of the present invention.

FIG. 6 is a flowchart provided to explain a method of job management of an image forming apparatus according to an example embodiment of the present invention. In operation S610, it is determined whether one or more jobs of the image forming apparatus has an error during operation thereof. Upon determination that the one or more jobs of image forming apparatus has an error, in operation S620, information regarding the job having the error and other jobs related to the error is provided. More specifically, information regarding the job having the error or other jobs related to the error from a list of pre-stored (or queued) jobs may be displayed. At the same time, the occurrence of the error may be notified to a terminal device which is connected with the image forming apparatus.

In operation S630, if a user manipulates the user manipulation unit 121 to set the attributes of the job management, in operation S640, a job management function is performed according to the set attributes of the job management. Categorizing, keeping, and/or deleting of jobs may be implemented according to the job management attributes. For example, if categorizing is selected as the user's job management attribute and a "user" is used as a reference (or the attributes) for the categorization, a job having an error and other jobs related with the error are categorized and displayed according to the attribute "user", while a job selected by the user is stored for later processing if the user's job management attribute includes the storing. If the job management attribute includes a deleting operation, a job having an error or other jobs related with the error selected by the user may be deleted from the list of jobs. In one implementation, if a user sets deleting and storing operations as the job management attributes without selecting a separate job, all the related jobs may be stored or deleted. Accordingly, the user does not have to manage the jobs every time an error is occurs, and also is able to manage the jobs that potentially have the error prior to encountering the error.

With the image forming apparatus and a job management method thereof according to the example embodiments of the present invention, it is possible to manage a job having an error or other jobs likely to have the error with ease, when the image forming apparatus has an error.

Although discussed in terms of one or more jobs of an image forming device as having an error, example embodiments of the present invention includes the situation when the image forming device has an error so that one or more of its function are not operable. In this case, jobs related to the function that is not operable may be delayed while jobs related to functions that are operable may be performed instead.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof.

For example, an error may refer to a factor that causes non-performance of a job. In example embodiments, an error related job may refer to a job that potentially or actually have the error.

In example embodiments, the job attributes also includes an address of the recipient, or a time when the job should be performed. In example embodiments, the type of the job may also include transmitting, scanning, or other operations to be performed relative to information or data.

In example embodiments, a user may be notified to fix the error after the job having the error and/or the other jobs related to the error are moved toward an end of the list. If the error is not fixed within a predetermined time period, the job having the error or the other jobs related to the error then may be deleted, or may be simply not performed.

Accordingly, it is intended, therefore, that the present invention not be limited to the various example embodiments disclosed, but that the present invention includes all embodiments falling within the scope of the appended claims.

What is claimed is:

1. A method of job management of an image forming apparatus comprising:
   detecting an occurrence of an error during a processing of a job;
   upon detecting the occurrence of the error of the job, checking other jobs related to the error from among a list of pending jobs in a storage unit;
   categorizing the list of the pending jobs into a first category comprising the other jobs related to the error, and a second category comprising jobs unrelated to the error, wherein the jobs unrelated to the error would be processed with no error if the processing of the job was completed, and
   providing information about the other jobs.

2. The method of claim 1, wherein the providing of the information comprises categorizing the information regarding the job having the error and the other jobs related to the error according to job attributes, and
   wherein the job attributes comprise at least one of a user, a date, and a priority thereof and at least one of a type and a number of pages thereof.

3. The method of claim 2, wherein the providing of the information further comprises displaying a result of categorizing the information.

4. The method of claim 1, wherein the providing of the information further comprises transmitting the information regarding the job having the error and the other jobs related to the error to a terminal device connected to the image forming apparatus.

5. The method of claim 1, further comprising storing or deleting the job having the error and the other jobs related to the error.

6. The method of claim 5, further comprising performing a next job if the job having the error and the other jobs related to the error are stored or deleted according to a previously set condition.

7. The method of claim 1, further comprising:
   setting one or more job management attributes to manage the job having the error and the other jobs related to the error; and performing job management on the job having the error and the other jobs related to the error according to the job management attributes.

8. The method of claim 7, wherein the job management attributes are selected and/or input by a user.

9. The method of claim 7, wherein the performing of the job management comprises
categorizing the job having the error and the other jobs related to the error according to the job attributes and providing the result thereof, if the job management attributes comprise a categorization operation,
storing the job designated by a user selection, if the job management attributes comprise a storing operation, or
deleting the job designated by the user selection, if the job management attributes comprise a deletion operation.

10. An image forming apparatus comprising:
an error detecting unit to detect an occurrence of an error during processing of a job; and
a control unit to control a check and provision of information regarding the job having the error and another one or more jobs related to the error from among a plurality of jobs in a list of pending jobs in a storage unit, upon determining of the occurrence of the error by the error detecting unit, and categorize the list of the pending jobs into a first category comprising the other jobs related to the error and a second category comprising jobs unrelated to the error, wherein the jobs unrelated to the error would be processed with no error if the processing of the job was completed.

11. The image forming apparatus of claim 10, further comprising:
the storage unit to store information about the jobs; and
a display unit to display the information, wherein among the jobs stored in the storage unit, the control unit categorizes the information regarding the job having the error and the jobs related to the error according to job attributes and provides result as the information.

12. The image forming apparatus of claim 11, wherein the job attributes comprise at least one of a user, a type, a date, a number of pages, and a priority thereof.

13. The image forming apparatus of claim 10, further comprising an interface unit connected to a terminal device, and wherein the control unit provides the information regarding the other jobs related to the error to the terminal device through the interface unit, if the error detecting unit detects the error of the job.

14. The image forming apparatus of claim 10, wherein the control unit performs a control operation so that the job having the error and the other jobs related to the error are stored to the storage unit or deleted according to a previously set condition.

15. The image forming apparatus of claim 13, wherein the control unit performs a control operation to cause a next job in the list to be processed if the job having the error and the other jobs related to the error are deleted.

16. The image forming apparatus of claim 10, further comprising a user manipulation unit to allow selection or input of job management attributes regarding the job having the error and the other jobs related to the error.

17. The image forming apparatus of claim 16, wherein, if the job management attributes comprise a categorization operation, the control unit categorizes the job having the error and the other jobs related to the error according to the job management attributes and provides the result thereof.

18. The image forming apparatus of claim 16, further comprising the storage unit, wherein the control unit stores the job designated by a user selection to the storage unit if the job management attributes comprise a storing operation, and deletes the job designated by the user selection if the job management attributes comprise a deletion operation.

19. The image forming apparatus of claim 17, wherein the job management attributes comprise at least one of a user, a type, a date, a number of pages, and a priority thereof.

20. A method of managing jobs of an image forming apparatus connected to a network for use by multiple users, comprising:
determining a cause of an error in a job upon occurrence of the error during a processing of a plurality of jobs;
checking other jobs having same error from among the plurality of jobs in a storage unit prior to the occurrence of the error in the one or more of the plurality of jobs; and
categorizing the plurality of jobs into a first category comprising the other jobs having the same error and a second category comprising jobs not having the same error, wherein the jobs not having the same error would be processed with no error if the processing of the job was completed;
managing the other jobs having the same error by using received job management attributes; and
notifying the users of information about the other jobs.

21. The method of claim 20, wherein the managing of the other jobs include one of deleting, removing from a queue, delaying the other jobs having the same error, or combinations thereof.

22. An image forming apparatus, comprising:
an image forming unit to form an image on a printable medium in response to a job request by a user; and
a control unit to:
determine a cause of an error in the job upon occurrence of the error during a processing of a plurality of jobs;
check other jobs having a same error from among the plurality of the jobs prior to the occurrence of the error in the one or more of the plurality of jobs; and
categorize the plurality of jobs into a first category comprising the other jobs having the same error and a second category comprising jobs not having the same error, wherein the jobs not having the same error would be processed with no error if the processing of the job was completed; and
manage the other jobs having the same error based on received job management attributes.

23. The image forming apparatus of claim 22, wherein the control unit manages the other jobs by one of deleting, removing from a queue, delaying the other jobs having the same error, or combinations thereof.

* * * * *

UNITED STATES PATENT AND TRADEMARK OFFICE
CERTIFICATE OF CORRECTION

PATENT NO. : 8,804,165 B2  Page 1 of 1
APPLICATION NO. : 12/188287
DATED : August 12, 2014
INVENTOR(S) : Hyun-sub Kil et al.

It is certified that error appears in the above-identified patent and that said Letters Patent is hereby corrected as shown below:

In the Claims

Column 8, line 36, in claim 1, delete "error," and insert -- error --, therefor.
Column 9, lines 21-22, in claim 10, delete "among a plurality of jobs in a list" and insert -- among a --, therefor.
Column 9, line 23, in claim 10, delete "error" and insert -- error of the job --, therefor.
Column 9, line 25, in claim 10, delete "other jobs" and insert -- jobs --, therefor.
Column 9, line 32, in claim 11, delete "about the" and insert -- about the other --, therefor.
Column 9, line 35, in claim 11, delete "the job" and insert -- the other jobs --, therefor.
Column 9, line 36, in claim 11, delete "jobs related to the" and insert -- other jobs having the same --, therefor.
Column 9, line 37, in claim 11, delete "result" and insert -- the result --, therefor.
Column 10, line 20, in claim 20, delete "having" and insert -- having the --, therefor.
Column 10, line 21, in claim 20, delete "of jobs" and insert -- of the jobs --, therefor.
Column 10, line 22, in claim 20, delete "jobs; and" and insert -- jobs; --, therefor.
Column 10, line 43, in claim 22, delete "jobs prior" and insert -- jobs in a storage unit prior --, therefor.
Column 10, line 44, in claim 22, delete "jobs; and" and insert -- jobs; --, therefor.
Column 10, line 51, in claim 22, delete "based on" and insert -- by using --, therefor.

Signed and Sealed this
Fifteenth Day of September, 2015

Michelle K. Lee
*Director of the United States Patent and Trademark Office*